(12) United States Patent
Warashina et al.

(10) Patent No.: US 12,090,664 B2
(45) Date of Patent: Sep. 17, 2024

(54) INTERFERENCE AVOIDANCE DEVICE AND ROBOT SYSTEM

(71) Applicant: Fanuc Corporation, Yamanashi (JP)

(72) Inventors: Fumikazu Warashina, Yamanashi (JP); Yuta Namiki, Yamanashi (JP); Kyouhei Kokubo, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 549 days.

(21) Appl. No.: 16/520,186

(22) Filed: Jul. 23, 2019

(65) Prior Publication Data

US 2020/0061825 A1 Feb. 27, 2020

(30) Foreign Application Priority Data

Aug. 24, 2018 (JP) .................................. 2018-156856

(51) Int. Cl.
*B25J 9/16* (2006.01)
*B25J 9/10* (2006.01)
(Continued)

(52) U.S. Cl.
CPC ............... *B25J 9/1666* (2013.01); *B25J 9/10* (2013.01); *B25J 9/1676* (2013.01); *B25J 9/1697* (2013.01);
(Continued)

(58) Field of Classification Search
CPC ........ B25J 13/08; B25J 13/089; B25J 13/088; B25J 19/02; B25J 19/021; B25J 19/023;
(Continued)

(56) References Cited

U.S. PATENT DOCUMENTS

2002/0169522 A1* 11/2002 Kanno ............... G05B 19/4061
700/245
2010/0185327 A1 7/2010 Nakajima et al.
(Continued)

FOREIGN PATENT DOCUMENTS

CN 106598046 A 4/2017
CN 108256430 A 7/2018
(Continued)

OTHER PUBLICATIONS

Usui, Takumi; Notice of Reasons for Refusal; Japanese Patent Application No. 2018-156856; Jul. 28, 2020; 6 pages.

*Primary Examiner* — Khoi H Tran
*Assistant Examiner* — Sarah A Tran
(74) *Attorney, Agent, or Firm* — Maier & Maier, PLLC

(57) ABSTRACT

An interference avoidance device is provided with: a three-dimensional sensor that is attached to a tip portion of a robot arm and acquires a distance image of an area around a robot; a position data creating portion that converts coordinates of a nearby object in the distance image to coordinates on a robot coordinate system and creates the position data of the nearby object based on the coordinates of the nearby object on the robot coordinate system; a storage portion that stores the position data; and a control portion that controls the robot based on the robot coordinate system; and the control portion controls the robot to avoid interference of the robot with the nearby object, based on the position data stored in the storage portion.

7 Claims, 3 Drawing Sheets

(51) Int. Cl.
  *B25J 13/08*    (2006.01)
  *B25J 19/02*    (2006.01)
  *G01B 11/14*    (2006.01)
  *G05B 19/4061*  (2006.01)
  *G05B 19/408*   (2006.01)

(52) U.S. Cl.
  CPC ........... *B25J 13/089* (2013.01); *B25J 19/021* (2013.01); *G01B 11/14* (2013.01); *G05B 19/4061* (2013.01); *G05B 19/4086* (2013.01); *G05B 2219/39022* (2013.01); *G05B 2219/40317* (2013.01); *G05B 2219/40476* (2013.01)

(58) Field of Classification Search
  CPC ......... B25J 9/00; B25J 9/10; B25J 9/16; B25J 9/1664; B25J 9/1666; B25J 9/1656; B25J 9/1676; B25J 9/1697; B25J 9/1602; B25J 9/1679; B25J 9/1674; B25J 9/1694; G01B 11/00; G01B 11/14; G01B 11/02; G01B 11/002; G05B 19/18; G05B 19/406; G05B 19/4061; G05B 19/408; G05B 19/4086; G05B 2219/40; G05B 2219/39; G05B 2219/39022; G05B 2219/40317; G05B 2219/40476; G05B 2219/40613
  USPC ....................................................... 700/245
  See application file for complete search history.

(56) References Cited

U.S. PATENT DOCUMENTS

| | | | |
|---|---|---|---|
| 2012/0053727 | A1* | 3/2012 | Nakajima ........... G05D 1/0274 901/1 |
| 2017/0210011 | A1  | 7/2017 | Hull |
| 2018/0004188 | A1* | 1/2018 | Yamaguchi ................ B25J 9/16 |
| 2018/0056515 | A1* | 3/2018 | Boca ...................... B25J 9/1697 |
| 2018/0065254 | A1* | 3/2018 | Okahisa .................... B25J 9/06 |
| 2018/0161978 | A1  | 6/2018 | Naitou |

FOREIGN PATENT DOCUMENTS

| | | |
|---|---|---|
| EP | 1985416 A1 | 10/2008 |
| EP | 2314428 A1 | 4/2011 |
| EP | 2314429 A1 | 4/2011 |
| JP | 2007-216350 A | 8/2007 |
| JP | 2010131751 A | 6/2010 |
| JP | 2010-142910 A | 7/2010 |
| JP | 2012-040669 A | 3/2012 |
| JP | 5370127 B2 * | 12/2013 |
| JP | 2018-094641 A | 6/2018 |

\* cited by examiner

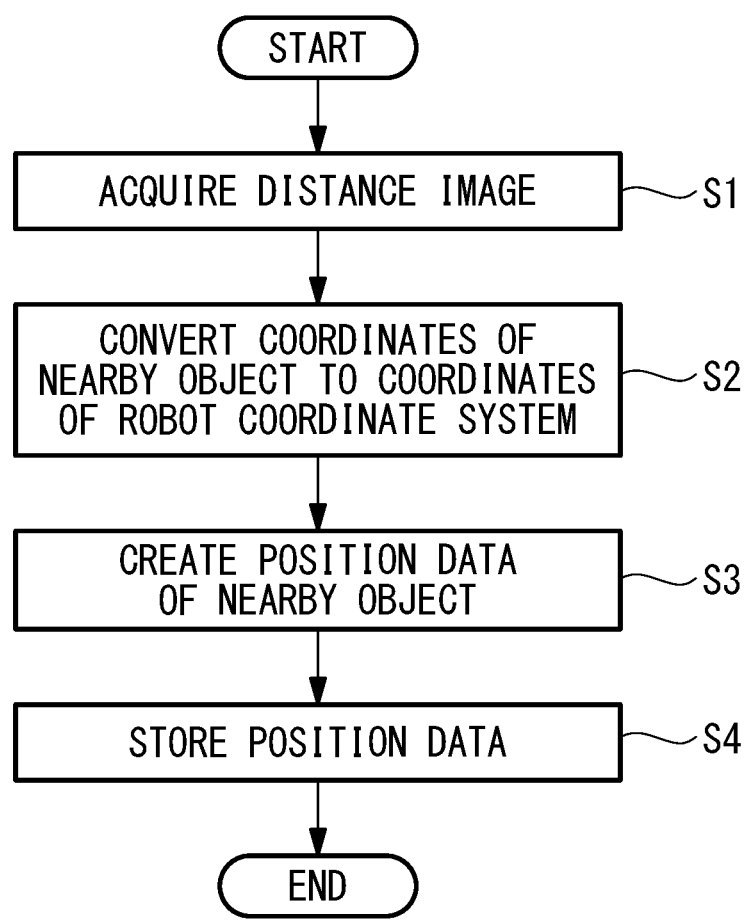

INTERFERENCE AVOIDANCE DEVICE AND ROBOT SYSTEM

CROSS-REFERENCE TO RELATED APPLICATIONS

This application claims the benefit of Japanese Patent Application No. 2018-156856, the content of which is incorporated herein by reference.

TECHNICAL FIELD

The present invention relates to an interference avoidance device and a robot system.

BACKGROUND ART

Conventionally, a robot system having a function of avoiding interference between a robot and a nearby object has been known (for example, Patent Literatures 1 to 4).

In Patent Literatures 1 to 3, while a workpiece and the position of an object near the workpiece are being detected by a sensor at the tip of a robot arm, the position of a hand is controlled so that the hand does not interfere with the object.

In Patent Literature 4, in order to avoid interference between a robot and obstacles around the robot, a camera image of a surrounding area around the robot is acquired by a 3D camera, and an interference area where an obstacle exists is set based on the camera image. After that, the robot is controlled so that movement of the robot into the interference area is forbidden. Here, in Patent Literature 4, an image of the surrounding area including the robot is picked up from the outside of the robot by the 3D camera. A marker for recognizing the robot in the camera image is attached to the robot. The coordinates of an obstacle in the camera image are converted to coordinates on a robot coordinate system, based on the marker in the camera image.

CITATION LIST

Patent Literature

{PTL 1} Japanese Unexamined Patent Application, Publication No. 2011-125989
{PTL 2} Japanese Unexamined Patent Application, Publication No. 2002-331480
{PTL 3} Japanese Unexamined Patent Application, Publication No. 2018-001332
{PTL 4} Publication of Japanese Patent No. 5980873

SUMMARY OF INVENTION

An aspect of the present invention is an interference avoidance device avoiding interference between a robot and a nearby object disposed near the robot, the interference avoidance device including: a three-dimensional sensor that is attached to a tip portion of a robot arm of the robot and acquires a distance image of an area around the robot; a position data creating portion that converts coordinates of the nearby object in the distance image to coordinates on a robot coordinate system and creates position data of the nearby object based on the coordinates of the nearby object on the robot coordinate system; a storage portion that stores the position data; and a control portion that controls the robot based on the robot coordinate system; wherein the control portion controls the robot to avoid interference of the robot with the nearby object, based on the position data of the nearby object stored in the storage portion.

BRIEF DESCRIPTION OF DRAWINGS

FIG. 3 is a flowchart showing an operation of the robot system of FIG. 1.

DESCRIPTION OF EMBODIMENTS

An interference avoidance device and a robot system according to one embodiment of the present invention will be described below with reference to drawings.

Figure 1:
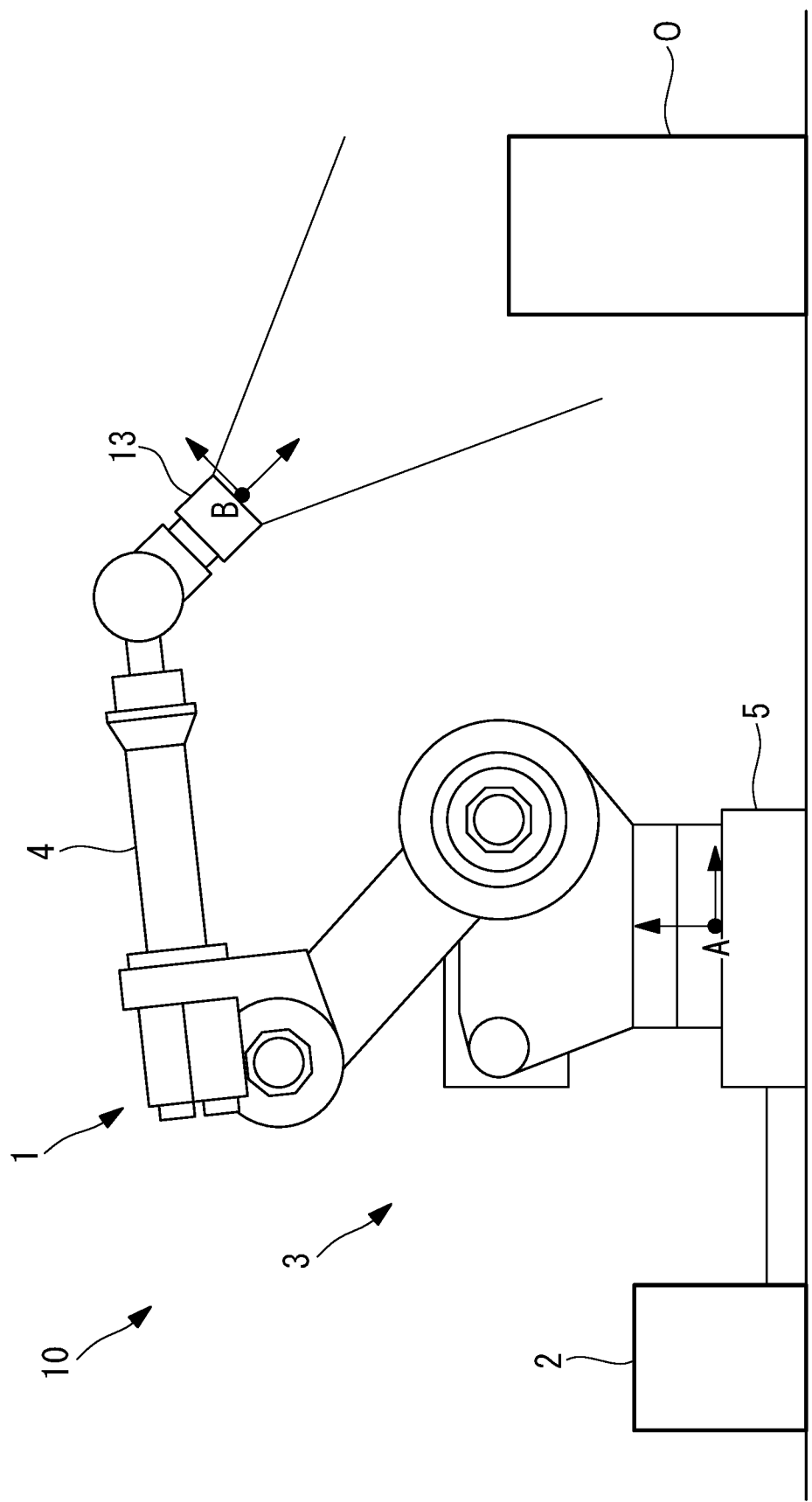
FIG. 1 is an overall configuration diagram of a robot system according to one embodiment of the present invention.
Figure 2:
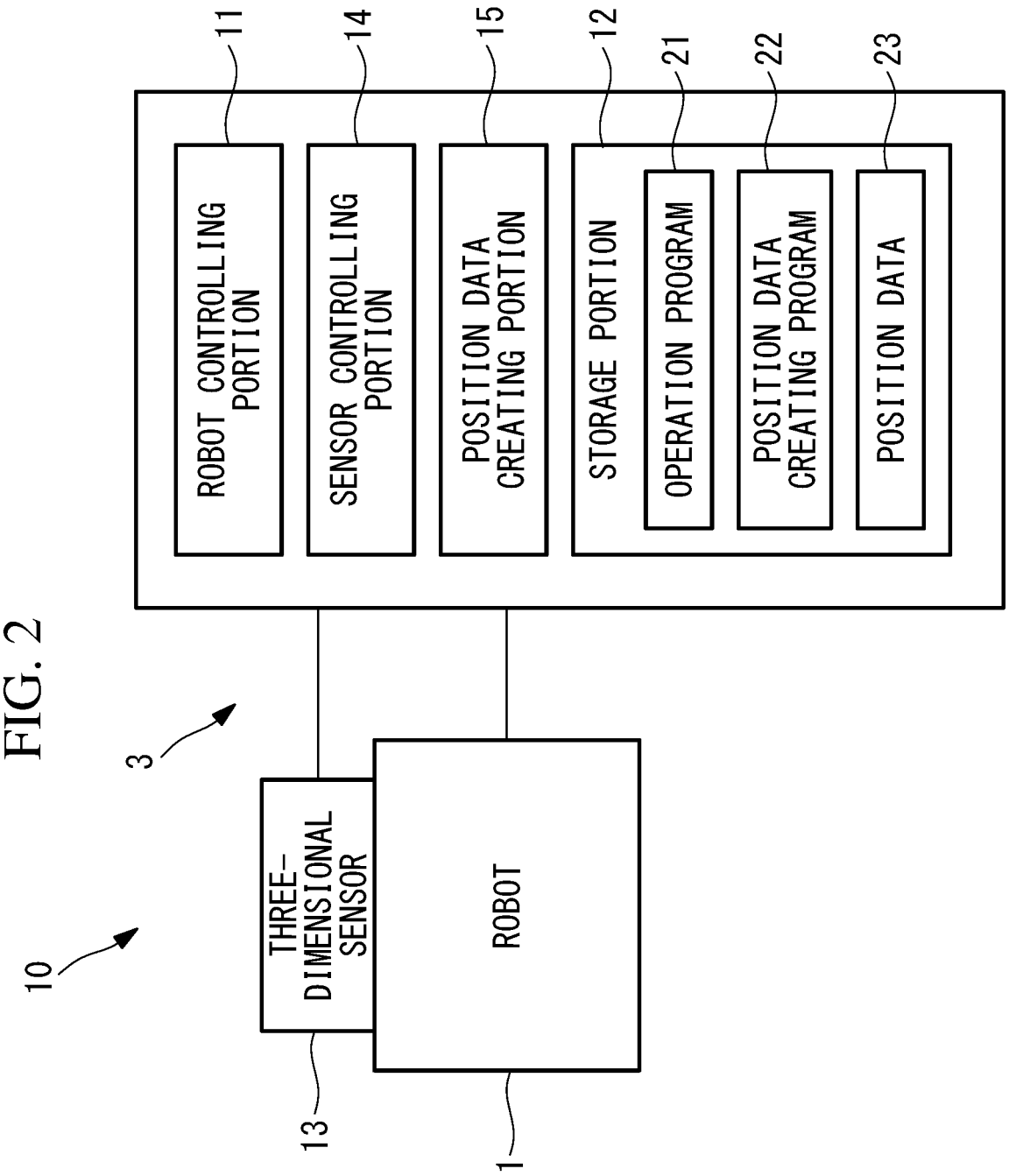
FIG. 2 is a block diagram of the robot system of FIG. 1.

As shown in FIG. 1, a robot system 10 according to the present embodiment is a system that, in an environment where a nearby object O is disposed near a robot 1, controls the robot 1 that is working to avoid interference of the robot 1 with the nearby object O. The nearby object O is, for example, an apparatus, another robot, a structure or the like. As shown in FIGS. 1 and 2, the robot system 10 is provided with the robot 1, a control device 2 connected to the robot 1, and an interference avoidance device 3 that avoids interference of the robot 1 with the nearby object O.

The robot 1 is, for example, a 6-axis articulated robot. The robot 1 has a robot arm 4 provided with a plurality of joints and can three-dimensionally change the position and attitude of the tip of the robot arm 4 by operations of the joints. The position and attitude of a three-dimensional sensor 13 (to be described later) attached to a tip portion of the robot arm 4 are also changed together with the position and attitude of the tip of the robot arm 4. Each joint is provided with a servomotor (not shown), and each servomotor causes a corresponding joint to rotate according to a robot control signal from the control device 2. An end effector (not shown) like a hand or a tool is attached to a wrist flange at the tip of the robot arm 4. The robot 1 performs predetermined work such as conveyance or processing of a workpiece using the end effector.

A robot coordinate system A is defined for the robot 1. The robot coordinate system A is a three-dimensional coordinate system with a predetermined position of a portion of the robot 1 that does not move (for example, the center of an installation surface of a base 5) as the origin.

As shown in FIG. 2, the control device 2 is provided with a robot controlling portion 11 having a processor, and a storage portion 12 having a RAM, a ROM, a nonvolatile storage and the like.

An operation program 21 is stored in the storage portion 12. The robot controlling portion 11 generates a robot control signal for driving each servomotor based on the operation program 21 and transmits the robot control signal to each servomotor. Thereby, the robot arm 4 operates based on the operation program 21. Coordinates on the robot coordinate system A are used for control of the robot 1 by the robot controlling portion 11.

The interference avoidance device 3 is provided with the three-dimensional sensor 13, a sensor controlling portion 14 and a position data creating portion 15. The sensor controlling portion 14 and the position data creating portion 15 are provided, for example, in the control device 2. The robot controlling portion (a control portion) 11 and the storage portion 12 also function as a part of the interference avoidance device 3.

The three-dimensional sensor 13 is attached to the tip portion of the robot arm 4. For example, the three-dimensional sensor 13 is a stereo camera having a pair of cameras. The stereo camera calculates, from a stereo image acquired by the pair of cameras, a distance of an object in the stereo image from the stereo camera and generates a distance image. For example, the three-dimensional sensor 13 is a vision sensor that is attached to the wrist flange together with the end effector to observe a workpiece grasped or processed by the end effector. The three-dimensional sensor 13 may be a laser distance meter that outputs a laser beam to calculate a distance of an object, from a position and time of reflection of the laser beam.

The three-dimensional sensor 13 acquires distance images of an area around the robot 1. The distance images are images each pixel of which has information about the distance from the three-dimensional sensor 13 to an object. Preferably, a distance image pickup range includes the whole operation area where the robot 1 can be disposed during work. Distance images of such a wide range are obtained by three-dimensionally changing the position and attitude of the three-dimensional sensor 13 while pointing the three-dimensional sensor 13 at the outside of the robot 1 by an operation of the robot arm 4, and the three-dimensional sensor 13 acquiring the distance images at a plurality of positions and with a plurality of attitudes. The distance images are transmitted from the three-dimensional sensor 13 to the control device 2 and stored into the storage portion 12.

A sensor coordinate system B is defined for the three-dimensional sensor 13. The sensor coordinate system B is a three-dimensional coordinate system with a predetermined position of the three-dimensional sensor 13 as the origin. Coordinates of an object in a distance image are coordinates on the sensor coordinate system B.

The sensor controlling portion 14 controls the three-dimensional sensor 13. By causing the three-dimensional sensor 13 to execute image pickup in response to a sensor control signal from the robot controlling portion 11, the sensor controlling portion 14 causes the three-dimensional sensor 13 to acquire a distance image in synchronization with an operation of the robot arm 4.

The position data creating portion 15 has a processor and executes the following process according to a position data creating program 22 to be described later. The position data creating portion 15 reads out a distance image from the storage portion 12 and acquires three-dimensional coordinates of the surface of the nearby object O in the distance image. The acquired coordinates are coordinates on the sensor coordinate system B. Next, the position data creating portion 15 converts the coordinates of the surface of the nearby object O to coordinates on the robot coordinate system A based on the position and attitude of the three-dimensional sensor 13 on the robot coordinate system A when the distance image was acquired.

The position and attitude of the three-dimensional sensor 13 on the robot coordinate system A when the distance image was acquired is calculated from the position and attitude of the tip of the robot arm 4 and the position and attitude of the three-dimensional sensor 13 relative to the tip of the robot arm 4 when the distance image was acquired. The position and attitude of the tip of the robot arm 4 is calculated from a robot control signal. The calculation is performed, for example, by the robot controlling portion 11 or the position data creating portion 15.

Next, the position data creating portion 15 creates the position data 23 of the nearby object O based on the three-dimensional coordinates of the nearby object O on the robot coordinate system A. The position data 23 is, for example, a set of coordinates of the surface of the nearby object O on the robot coordinate system A.

In the storage portion 12, the position data creating program 22 is stored. The robot controlling portion 11 generates a robot control signal and a sensor control signal based on the position data creating program 22. The robot controlling portion 11 transmits the robot control signal to each servomotor and transmits the sensor control signal to the sensor controlling portion 14. Thereby, the robot arm 4 operates based on the position data creating program 22, and the three-dimensional sensor 13 acquires a distance image based on the position data creating program 22.

The robot controlling portion 11 generates a robot control signal for causing the tip of the robot arm 4 to move to a target position according to the operation program 21. Before transmitting the robot control signal to the robot 1, the robot controlling portion 11 estimates whether the robot 1 interferes with the nearby object O before the tip reaches the target position, based on the position data 23. If it is estimated that the robot 1 does not interfere with the nearby object O, the robot controlling portion 11 transmits the robot control signal to the robot 1 to cause the tip of the robot arm 4 to move to the target position. On the other hand, if it is estimated that the robot 1 interferes with the nearby object O, the robot controlling portion 11 controls the robot 1 to avoid the interference of the robot 1 with the nearby object O. For example, the robot controlling portion 11 stops transmission of the robot control signal to the robot 1 and causes the operation of the robot 1 to stop.

Interference of the robot 1 with the nearby object O is estimated, for example, according to the following procedure.

As the position data 23, coordinates of positions on the surface of the nearby object O, $Pi=(Xi, Yi, Zi)$ ($i=1, 2, \ldots, n$) are stored in the storage portion 12. The coordinates Pi are coordinates on the robot coordinate system A. The robot controlling portion 11 defines the three-dimensional shape of the robot 1 as a plurality of cylindrical areas Cj ($j=1, 2, \ldots, m$). That is, the three-dimensional shape of the robot 1 is represented as a combination of the plurality of areas Cj. Actually, since it is difficult to accurately represent the three-dimensional shape of the robot 1 by a combination of the plurality of areas Cj, each of the areas Cj is set so that the whole robot 1 is included in a combination of the plurality of areas Cj.

The robot controlling portion 11 calculates the three-dimensional shape Cj of the robot 1 when it is assumed that the robot arm 4 operates according to a robot control signal. Next, for $i=1, 2, \ldots, n$ and $j=1, 2, \ldots, m$, the robot controlling portion 11 performs calculation about whether (i, j) satisfying $Pi \in Cj$ exists or not. If such (i, j) does not exist, the robot controlling portion 11 estimates that the robot 1 does not interfere with the nearby object O. On the other hand, if such (i, j) exists, the robot controlling portion 11 estimates that the robot 1 interferes with the nearby object O.

Next, operation of the robot system 10 configured as described above will be described.

According to the robot system 10 according to the present embodiment, the position data creating program 22 is executed, and the operation program 21 is executed after that.

When the position data creating program 22 is executed, the position and attitude of the three-dimensional sensor 13 is changed by an operation of the robot arm 4, and the three-dimensional sensor 13 acquires distance images at a plurality of positions and with a plurality of attitudes as shown in FIG. 3. Thereby, distance images around the robot 1 are acquired (step S1). The distance images are transmitted from the three-dimensional sensor 13 to the control device 2 and stored into the storage portion 12. Next, by the position data creating portion 15, three-dimensional coordinates of the nearby object O in the distance images are acquired; the coordinates of the nearby object O are converted to coordinates on the robot coordinate system A (step S2); and the position data 23 of the nearby object O is created from the coordinates of the nearby object O on the robot coordinate system A (step S3). The position data 23 is stored into the storage portion 12 (step S4).

The position data creating program 22 may be executed every time before the operation program 21 is executed. Or alternatively, the position data creating program 22 may be executed only when the environment around the robot 1 changes, such as after the robot 1 having been caused to move and after arrangement of peripheral equipment having been changed.

Next, the operation program 21 is executed. The robot controlling portion 11 causes the robot 1 to execute predetermined work according to the operation program 21. Further, the robot controlling portion 11 reads out the position data 23 from the storage portion 12, and controls the robot 1 that is working to avoid interference of the robot arm 4 with the nearby object O, based on the position data 23. For example, the robot controlling portion 11 estimates whether the robot 1 interferes with the nearby object O at the next target position of the tip of the robot arm 4 or on a movement route to the target position, and, if occurrence of interference is estimated, causes the robot 1 to stop.

Thus, according to the present embodiment, a distance image of the nearby object O is acquired by the three-dimensional sensor 13 attached to the tip portion of the robot arm 4. There is an advantage that it is possible to acquire the accurate position data 23 of the nearby object O based on the distance image and certainly avoid interference of the robot 1 with the nearby object O based on the accurate position data 23.

Specifically, in order to convert the position of the nearby object O in a distance image to a position on the robot coordinate system A, information about the position and attitude of the three-dimensional sensor 13 on the robot coordinate system A when the distance image was acquired is necessary. According to the present embodiment, the accurate position and attitude of the three-dimensional sensor 13 on the robot coordinate system A can be obtained from a robot control signal by simple calculation. Therefore, it is possible to calculate the accurate position of the nearby object O on the robot coordinate system A.

A distance image is an image when the nearby object O is seen from the tip portion of the robot arm 4. Therefore, a blind spot that cannot be image-picked up by the three-dimensional sensor 13 does not occur in the operation area of the robot 1, and it is possible to certainly recognize the nearby object O existing in the operation area from a distance image. Further, it is possible to obtain the accurate position of the nearby object O seen from the robot 1, from the distance image.

In the case of acquiring a distance image by the three-dimensional sensor 13 at the tip portion of the robot arm 4, an image of the robot 1 itself is not often picked up, unlike the case of acquiring a distance image of the nearby object O by a three-dimensional sensor disposed near the robot 1. However, a part of the robot 1 may be included in a distance image. If the part of the robot 1 in the distance image is a movable portion (for example, the robot arm 4), and the coordinates of the movable portion are stored as the position data 23, the robot controlling portion 11 misrecognizes that a three-dimensional area where the movable portion was disposed when the distance image was acquired as the nearby object O, and controls the robot 1 to avoid the area.

In order to prevent such an unnecessary interference avoidance operation, the position data creating portion 15 may exclude the coordinates of a part of the robot 1 from the coordinates of the nearby object O acquired from a distance image and create the position data 23 from remaining coordinates.

The position data creating portion 15 determines whether the coordinates of the nearby object O after coordinate conversion are the self-coordinates of a movable portion of the robot 1 or not. The self-coordinates of a movable portion of the robot 1 are coordinates of a three-dimensional area where the movable portion was disposed when the distance image was acquired, on the robot coordinate system A. The position data creating portion 15 creates the position data 23 from coordinates of the nearby object O other than the coordinates of the nearby object O that are the self-coordinates.

The self-coordinates of the robot 1 can be easily calculated from a robot control signal. Therefore, it can be easily determined whether an object in a distance image is the nearby object O or a part of the robot 1. The self-coordinates of the robot 1 calculated based on the position data creating program 22 may be stored in the storage portion 12 in advance.

In the present embodiment, the position data creating portion 15 may create the position data 23 including all the coordinates of the nearby object O obtained from a distance image but may decimate the coordinated of the nearby object O acquired from a distance image and create the position data 23 from remaining coordinates. For example, if two sets of coordinates of the nearby object O within a predetermined distance, only one set may be used for the position data 23.

By reducing the number of coordinates to be included into the position data 23 in this way, it is possible to reduce the amount of information of the position data 23. It is also possible to reduce processing time required for judgment of interference of the robot 1 with the nearby object O.

From the above-described embodiment, the following invention is derived.

An aspect of the present invention is an interference avoidance device avoiding interference between a robot and a nearby object disposed near the robot, the interference avoidance device including: a three-dimensional sensor that is attached to a tip portion of a robot arm of the robot and acquires a distance image of an area around the robot; a position data creating portion that converts coordinates of the nearby object in the distance image to coordinates on a robot coordinate system and creates position data of the nearby object based on the coordinates of the nearby object on the robot coordinate system; a storage portion that stores the position data; and a control portion that controls the robot based on the robot coordinate system; wherein the control portion controls the robot to avoid interference of the robot with the nearby object, based on the position data of the nearby object stored in the storage portion.

According to the present aspect, the position data of the nearby object is acquired by the three-dimensional sensor and the position data creating portion and stored into the storage portion before the robot performs work. That is, distance images of an area around the robot are acquired by the three-dimensional sensor, and the position data of the nearby object on the robot coordinate system is created from the distance images by the position data creating portion. After that, the robot performs the work avoiding interference with the nearby object according to control by the control portion.

Since being attached to the tip portion of the robot arm, the three-dimensional sensor can easily acquire accurate position data of the nearby object. It is possible to certainly avoid interference of the robot with the nearby object based on such accurate position data.

That is, the accurate position and attitude of the three-dimensional sensor on the robot coordinate system when the distance image was acquired can be easily obtained from a control signal used to control the robot by the control portion. Therefore, it is possible to accurately convert the coordinates of the nearby object in the distance image to coordinates on the robot coordinate system by simple calculation and acquire the accurate position of the nearby object on the robot coordinate system.

Further, a distance image of the nearby object seen from the robot can be obtained by the three-dimensional sensor. Therefore, a blind spot of the three-dimensional sensor does not occur in the operation area of the robot, and it is possible to accurately grasp the existence of the nearby object in the operation area. Further, it is possible to obtain the accurate position of the nearby object seen from the robot.

In the above aspect, the position data creating portion may determine whether each of the coordinates of the nearby object on the robot coordinate system is a self-coordinate of the robot, the self-coordinate being a coordinate of the robot on the robot coordinate system when the distance image was acquired, and create the position data based on coordinates of the nearby object on the robot coordinate system other than coordinates of the nearby object that are the self-coordinates.

A part of the robot can be included in a distance image. The position of the part of the robot in the distance image changes accompanying an operation of the robot. Therefore, if position data of the part of the robot in the distance image is stored into the storage portion, the control portion misrecognizes that a nearby object exists at the position of the part of the robot when the distance image was acquired, and controls the robot to avoid the position. According to the above configuration, it is possible to prevent such misrecognition and prevent an unnecessary avoidance operation of the robot.

In the above aspect, the robot arm has a plurality of joints and is capable of three-dimensionally changing a position and an attitude of the three-dimensional sensor by operations of the joints; and the control portion may cause the three-dimensional sensor to acquire the distance image while causing the plurality of joints of the robot arm to operate.

According to this configuration, it is possible to acquire distance images of a wide range around the robot using one three-dimensional sensor.

In the above aspect, the three-dimensional sensor may acquire the distance image of a range including a whole operation area of the robot.

According to this configuration, the coordinates of all nearby objects in the operation area where the robot that is working can be disposed are acquired from distance images, and position data about all the nearby objects is stored into the storage portion. Thereby, it is possible to more certainly avoid interference of the robot with the nearby objects.

Another aspect of the present invention is a robot system provided with a robot including a robot arm; and the interference avoidance device according to any of the above descriptions.

REFERENCE SIGNS LIST 1 robot
2 control device
3 interference avoidance device
4 robot arm
5 base
10 robot system
11 robot controlling portion
12 storage portion
13 three-dimensional sensor
14 sensor controlling portion
15 position data creating portion
21 operation program
22 position data creating program
23 position data

The invention claimed is:

1. An interference avoidance device avoiding interference between a robot that includes a robot arm and to which a three-dimensional sensor having a first coordinate system is attached on the robot arm and a nearby object disposed near the robot, the robot having a second coordinate system, the interference avoidance device comprising:
a processor that is configured to perform a first control and a second control that are different from each other,
wherein the first control comprises:
transmitting, to the robot, a first control signal for causing the robot to dispose the three-dimensional sensor at a plurality of positions and/or attitudes from which a corresponding plurality of distance images are acquired, such that the plurality of distance images encompass a whole operational range in which the robot is capable of being disposed and such that one or more of the plurality of distance images includes the nearby object;
causing the three-dimensional sensor to acquire the plurality of distance images;
calculating, from the first control signal and for each of the plurality of distance images, a position and an attitude of the three-dimensional sensor on the second coordinate system when the distance image is acquired;
converting coordinates of the nearby object from coordinates on the first coordinate system to coordinates on the second coordinate system based on the plurality of distances image and the calculated position (s) and attitude(s);
determining whether the converted coordinates include self-coordinates of the robot;
eliminating from the converted coordinates the self-coordinates captured in the plurality of distance images; and
creating position data of the nearby object on the second coordinate system based on the converted coordinates, and
wherein the second control comprises:
before transmitting a second control signal for moving the robot arm to the robot, determining, based on the created position data and the second control signal, whether the robot arm interferes with the nearby object if the robot arm is moved according to the second control signal; and in response to determining that the robot arm does not interfere with the nearby object, transmitting the second control signal to the robot.

2. The interference avoidance device according to claim 1, wherein:
the robot arm has a plurality of joints and is configured to three-dimensionally change a position and an attitude of the three-dimensional sensor by operations of the joints; and
the three-dimensional sensor is disposed at the plurality of positions and/or attitudes via operation of the plurality of joints.

3. A robot system comprising:
a robot comprising a robot arm; and
the interference avoidance device according to claim 1.

4. The interference avoidance device according to claim 1, wherein the plurality of positions and/or attitudes are distributed to eliminate blind spots in the whole operational range in which the robot is capable of being disposed.

5. The interference avoidance device according to claim 1, wherein the nearby object is a plurality of distinct nearby objects.

6. The interference avoidance device according to claim 1, wherein the three-dimensional sensor is a stereo camera.

7. The interference avoidance device according to claim 1, wherein the three-dimensional sensor is a laser distance meter.

* * * * *